US010938056B2

(12) United States Patent
Bae et al.

(10) Patent No.: US 10,938,056 B2
(45) Date of Patent: Mar. 2, 2021

(54) SECONDARY BATTERY

(71) Applicant: Samsung SDI Co., Ltd., Yongin-si (KR)

(72) Inventors: Sangjune Bae, Yongin-si (KR); Seokjoon Yoon, Yongin-si (KR); Chanho Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 547 days.

(21) Appl. No.: 15/228,777

(22) Filed: Aug. 4, 2016

(65) Prior Publication Data
US 2017/0040634 A1 Feb. 9, 2017

(30) Foreign Application Priority Data
Aug. 4, 2015 (KR) .......................... 10-2015-0110231

(51) Int. Cl.
| | | |
|---|---|---|
| *H01M 10/02* | (2006.01) | |
| *H01M 2/02* | (2006.01) | |
| *H01M 2/10* | (2006.01) | |
| *H01M 10/04* | (2006.01) | |

(52) U.S. Cl.
CPC ......... *H01M 10/02* (2013.01); *H01M 2/0202* (2013.01); *H01M 2/0237* (2013.01); *H01M 10/0413* (2013.01); *H01M 10/0436* (2013.01); *H01M 2200/20* (2013.01)

(58) Field of Classification Search
CPC ...................... H01M 10/0413; H01M 10/0436
See application file for complete search history.

(56) References Cited

U.S. PATENT DOCUMENTS

| | | | |
|---|---|---|---|
| 2008/0286644 A1* | 11/2008 | Yeo | G09F 3/02 429/122 |
| 2013/0216896 A1 | 8/2013 | Kim | |
| 2013/0230767 A1 | 9/2013 | Pak et al. | |
| 2013/0344372 A1* | 12/2013 | Carkner | H01M 2/021 429/127 |

FOREIGN PATENT DOCUMENTS

| | | | |
|---|---|---|---|
| JP | 2003068257 A | * | 3/2003 |
| KR | 2012-0008297 A | | 1/2012 |
| KR | 2013-0094638 A | | 8/2013 |
| KR | 2013-0100701 A | | 9/2013 |

* cited by examiner

*Primary Examiner* — Stephan J Essex
(74) *Attorney, Agent, or Firm* — Knobbe, Martens, Olson & Bear, LLP

(57) ABSTRACT

A secondary battery includes a main body accommodating an electrode assembly, a wing portion bent in at least one portion, and a reinforcement member between the main body and the wing portion. Accordingly, as an external impact is blocked, the secondary battery has reduced danger of ignition, rupture, or explosion due to the external impact.

14 Claims, 8 Drawing Sheets

SECONDARY BATTERY

RELATED APPLICATIONS

This application claims the benefit of Korean Patent Application No. 10-2015-0110231, filed on Aug. 4, 2015, in the Korean Intellectual Property Office, the disclosure of which is incorporated herein in its entirety by reference.

BACKGROUND

Field

One or more exemplary embodiments relate to secondary batteries.

Description of the Related Art

As the technology for mobile devices such as mobile phones and laptop computers has continuously developed and the production of mobile devices has increased, the demand for secondary batteries as energy sources for such devices has rapidly grown. Recently, research has been actively conducted into secondary batteries as an alternative energy source to replace fossil fuel for use in electric vehicles, hybrid vehicles, or the like.

Secondary batteries according to the related art do not include a safety device for protection against an external impact, and thus there is a danger of ignition, rupture, and explosion of the secondary batteries.

SUMMARY OF CERTAIN INVENTIVE ASPECTS

One or more exemplary embodiments include a secondary battery with reduced danger of ignition, rupture, and explosion caused by an external impact, by blocking the external impact.

Additional aspects will be set forth in part in the description which follows and, in part, will be apparent from the description, or may be learned by practice of the presented embodiments.

According to one or more exemplary embodiments, secondary battery includes: a main body accommodating an electrode assembly; a wing portion extending from the main body and bent in at least one portion; and a reinforcement member between the main body and the wing portion.

The reinforcement member may include a circular rod having a circular cross-section.

The reinforcement member may include a rectangular rod having a rectangular cross-section.

The reinforcement member may have a rectangular cross-section and a pair of long side portions facing the main body and the wing portion and a pair of short side portions between the long side portions.

The wing portion may include a bent portion facing the main body and an extension portion between the main body and the bent portion.

The reinforcement member may be supported by the main body, the bent portion, and the extension portion.

The reinforcement member may contact the main body, the bent portion, and the extension portion.

The wing portion may include first and second bent portions facing the main body and first and second extension portions between the first and second bent portions.

The reinforcement member may be surrounded by the first and second bent portions and the first and second extension portions.

When the secondary battery includes a first side portion from which an electrode tab is withdrawn, a second side portion formed opposite the first side portion, and third and fourth side portions extending in parallel to each other between the first and second side portions, a pair of reinforcement members may be respectively formed at the third and fourth side portions.

When the secondary battery includes a pair of short side portions that are relatively short and a pair of long side portions that are relatively long, the reinforcement member may extend along the long side portions.

A position of the reinforcement member may be fixed using a fixation tape that surrounds the main body, the wing portion, and the reinforcement member.

When the secondary battery includes a first side portion from which an electrode tab is withdrawn, a second side portion formed opposite the first side portion, and third and fourth side portions extending in parallel to each other between the first and second side portions, a pair of reinforcement members may be respectively formed at the third and fourth side portions, and the fixation tape may include a first fixation tape surrounding the first side portion and a second fixation tape surrounding the second side portion.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF CERTAIN INVENTIVE EMBODIMENTS

Figure 1:
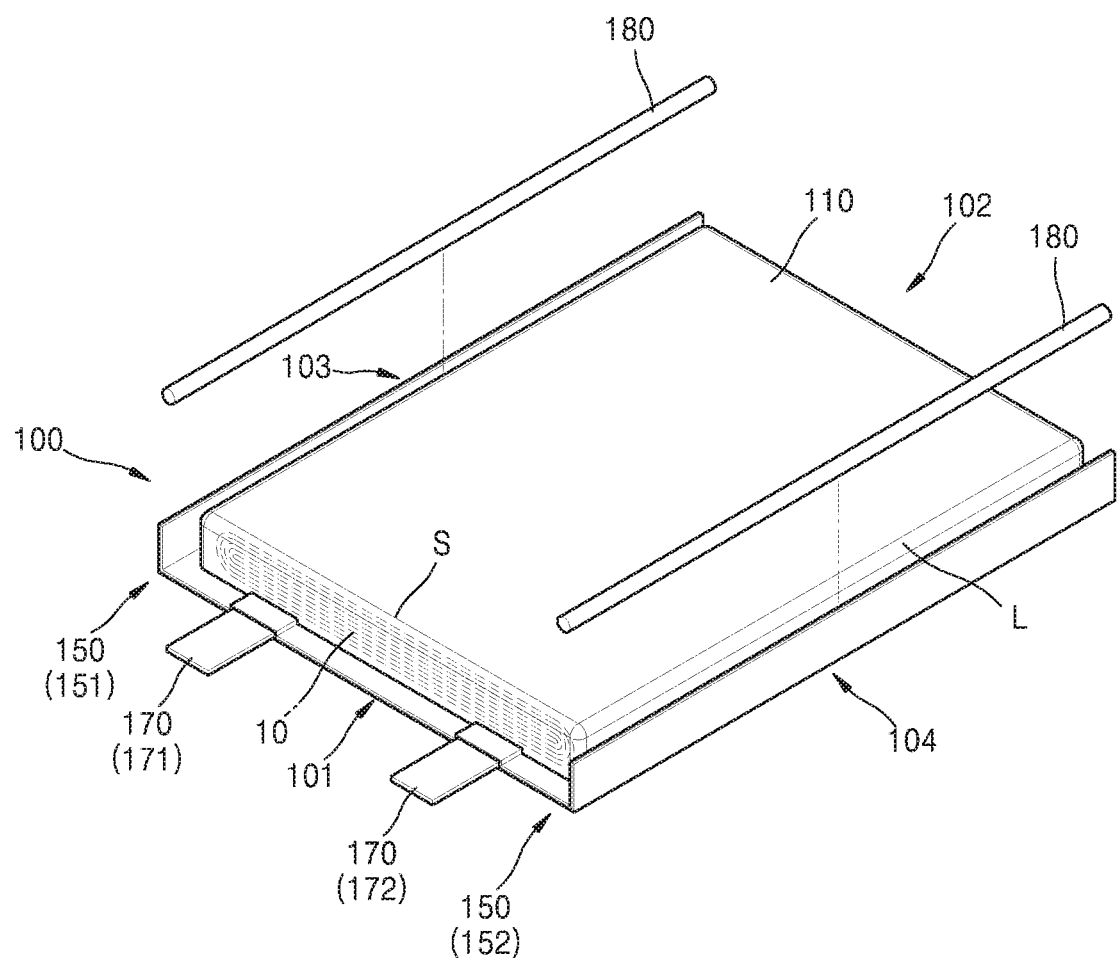
FIG. 1 is a disassembled perspective view of a secondary battery according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

Figure 2:
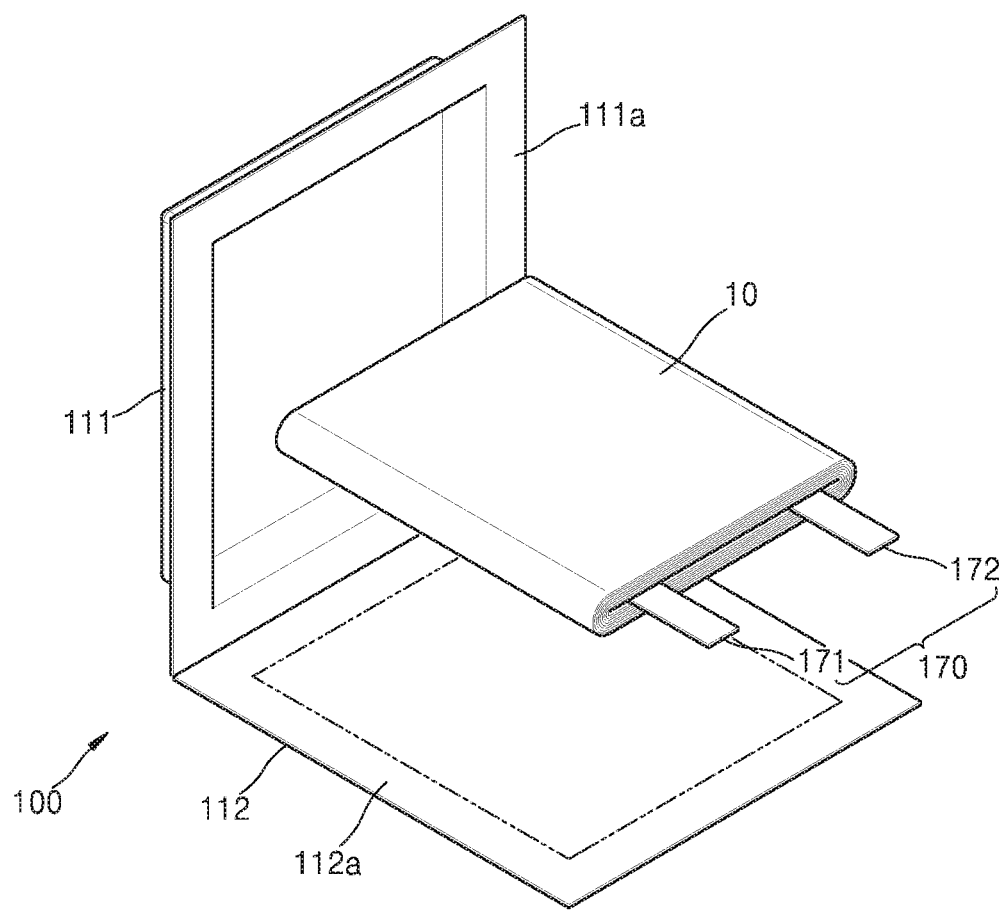
FIG. 2 is a disassembled perspective view illustrating an electrode assembly of the secondary battery FIG. 1.
Figure 3:
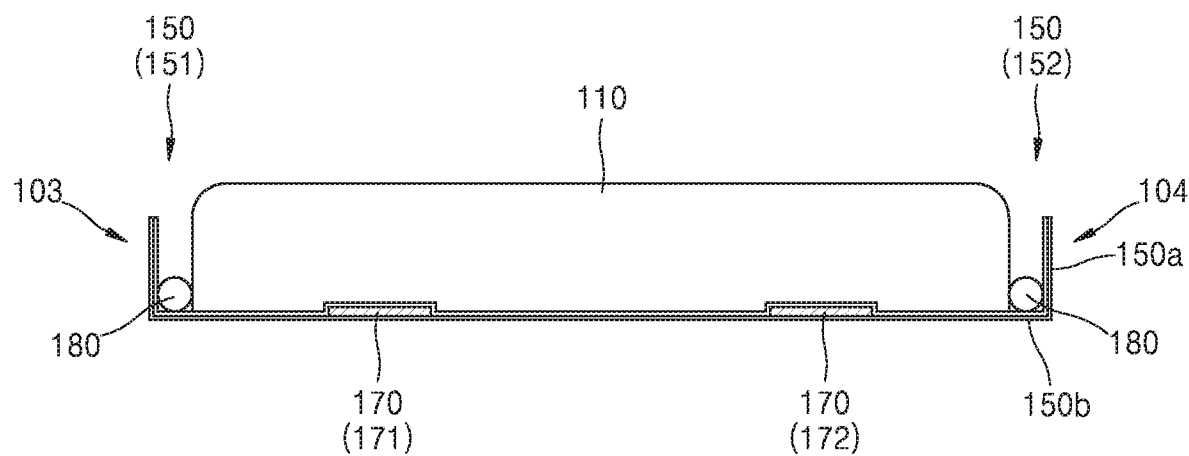
FIG. 3 is a diagram for describing a reinforcement member of the secondary battery FIG. 1.

FIG. 1 is a disassembled perspective view of a secondary battery according to an exemplary embodiment. FIG. 2 is a disassembled perspective view illustrating an electrode assembly 10 of the secondary battery of FIG. 1. FIG. 3 is a diagram for describing a reinforcement member 180 of the secondary battery of FIG. 1.

Referring to FIGS. 1 through 3, the secondary battery may include a main body 110 that accommodates the electrode assembly 10, a wing portion 150 that extends from the main body 110 and is bent at at least one portion thereof, and a reinforcement member 180 between the main body 110 and the wing portion 150.

The main body 110 and the wing portion 150 may be formed by a pouch 100 that encapsulates the electrode assembly 10. For example, the main body 110 may correspond to a portion of the pouch 100 accommodating the electrode assembly 10, and the wing portion 150 may correspond to portions of the pouch 100 formed by folding up sealing portions 111a and 112a of the pouch 100 to encapsulate the electrode assembly 10.

In detail, the secondary battery may include a pair of wing portions 150, that is, first and second wing portions 151 and 152. The pair of wing portions 150 may be disposed at opposite side portions of the secondary battery, for example, at third and fourth side portions 103 and 104.

The secondary battery may have an approximately hexahedral shape having two main surfaces including upper and lower surfaces and side portions 101, 102, 103, and 104 between the main surfaces.

For example, the side portions 101, 102, 103, and 104 may have a broader meaning and respectively include side surfaces and corner portions of the secondary battery. In detail, the side portions 101, 102, 103, and 104 of the secondary battery may include a first side portion 101 from which an electrode tab 170 is withdrawn, a second side portion 102 formed opposite the first side portion 101, and the third and fourth side portions 103 and 104 extending in parallel to each other between the first and second side portions 101 and 102.

As illustrated in FIG. 2, the pouch 100 may include an upper case 111 and a lower case 112. The upper case 111 and the lower case 112 are coupled to each other with the electrode assembly 10 therebetween and may form the main body 110 which approximately corresponds to the external appearance of the electrode assembly 10.

The sealing portions 111a and 112a are respectively formed along edges of the upper case 111 and the lower case 112, and the sealing portions 111a and 112a may be brought into contact with each other and then be thermally bonded to each other. Also, the sealing portions 111a and 112a of the upper case 111 and the lower case 112 may be folded up to form the wing portion 150.

The electrode assembly 10 may be manufactured, for example, by stacking a positive electrode plate coated with a positive electrode active material, a negative electrode plate coated with a negative electrode active material, and a separator disposed between the positive electrode plate and the negative electrode plate, and then winding the stacked structure in a jelly roll form. Alternatively, the electrode assembly 10 may also be manufactured by sequentially stacking a positive electrode plate, a separator, and a negative electrode plate several times.

The electrode tab 170 may be connected to the electrode assembly 10. The electrode tab 170 may include first and second electrode tabs 171 and 172 of different polarities. The electrode tab 170 is withdrawn to the outside through the first side portion 101 of the secondary battery, and although not illustrated, the electrode tab 170 may be electrically connected to a protection circuit module that controls charging and discharging operations of the secondary battery.

The secondary battery may include the reinforcement member 180. The reinforcement member 180 protects internal elements of the secondary battery from external impact, that is, protects the electrode assembly 10. In other words, the reinforcement member 180 prevents degradation in charging or discharging characteristics of the secondary battery or safety accidents such as explosion due to damages to the electrode assembly 10.

According to an exemplary embodiment of the present disclosure, the reinforcement member 180 may be formed as an elongated member that extends in parallel to the third and fourth side portions 103 and 104 of the secondary battery. For example, a pair of the reinforcement members 180 may be formed at the third and fourth side portions 103 and 104 of the secondary battery facing each other. The reinforcement member 180 may be formed at a position it does not disturb withdrawal of the electrode tab 170. In detail, the reinforcement member 180 may not be formed at the first side portion 101 from which the electrode tab 170 is withdrawn or at the second side portion 102 facing the first side portion 101, but at the third and fourth side portions 103 and 104 of the secondary battery.

If the secondary battery includes a pair of short side portions S that are relatively short and a pair of relatively long side portions L that are relatively long, the first and second side portions 101 and 102 of the secondary battery may correspond to the short side portions S, and the third and fourth side portions 103 and 104 may correspond to the long side portions L. The reinforcement member 180 may extend along the long side portions L and provides protecting against an external impact.

For example, the reinforcement member 180 extends along the third and fourth side portions 103 and 104 of the secondary battery, and may extend over the entire lengths of the third and fourth side portions 103 and 104. This structure is provided to protect the secondary battery in a relatively broad range. For example, in an area outside the reinforcement member 180, external impact may not be blocked nor distributed by the reinforcement member 180. Thus, a length of the reinforcement member 180 is increased as much as possible to thereby provide against unexpected external impact.

In regard to a position of the reinforcement member 180, the reinforcement member 180 may be formed between the main body 110 and the wing portions 150 of the secondary battery. The main body 110 of the secondary battery may correspond to a portion in which the electrode assembly 10 is accommodated, and the wing portions 150 may be formed of the sealing portions 111a and 112a of the pouch 100 are bent to face the main body 110 so as to be separated from the main body 110. The reinforcement member 180 may be disposed in space between the main body 110 and the wing portions 150. That is, the reinforcement member 180 may be disposed between the main body 110 and the wing portions 150 that extend in parallel to each other to face each other.

In regard to a shape of the reinforcement member 180, the reinforcement member 180 may have a cylindrical rod shape having a circular cross-section. The reinforcement member 180 having a cylindrical rod shape may prevent damages to the main body 110 and the wing portions 150 due to physical interference between the main body 110 and the wing portions 150 that are around the reinforcement member 180. In addition, the reinforcement member 180 having a cylindrical rod shape has no particular directivity due to the circular cross-section, and thus may be easily assembled when assembling the reinforcement member 180.

In regard to a size of the reinforcement member 180, the reinforcement member 180 may be formed of a cylindrical rod having a diameter of 1 mm or smaller. In detail, the reinforcement member 180 may have a diameter of 1±0.5 mm by considering processing tolerance.

In regard to a material of the reinforcement member 180, the reinforcement member 180 may be formed of a metal. The reinforcement member 180 protects internal elements, that is, protects an electrode assembly, against external impact, and thus may be formed of a metal having appropriate rigidity. For example, the reinforcement member 180 may be formed of a metal having a suitable rigidity to block external impact rather than an elastic material such as rubber or a soft material such as a resin.

Referring to FIG. 3, the wing portions 150 may include a bent portion 150a that is bent to face the main body 110 and an extension portion 150b formed between the main body 110 and the bent portion 150a. The reinforcement member 180 may be supported by the bent portion 150a and the extension portion 150b. For example, the reinforcement member 180 may be disposed in space between the main body 110 and the extension portion 150a, and may be supported by the main body 110 and the bent portion 150a and by the extension portion 150b between the main body 110 and the bent portion 150a. In detail, the reinforcement member 180 may contact the main body 110, the bent portion 150a, and the extension portion 150b.

Figure 4:
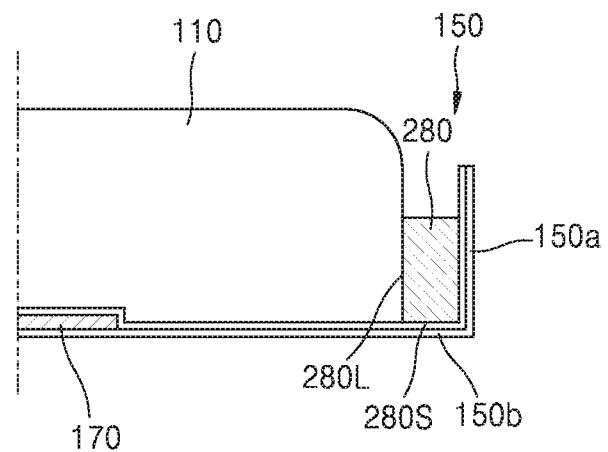
FIG. 4 illustrates a secondary battery according to another exemplary embodiment.

FIG. 4 illustrates a secondary battery according to another exemplary embodiment.

Referring to FIG. 4, the secondary battery may include a reinforcement member 280. The reinforcement member 280 may extend along a side portion of the secondary battery. For example, the reinforcement member 280 may extend over the entire length of the side portion of the secondary battery.

Although FIG. 4 illustrates only one side of the secondary battery, which is either the left or the right side, the secondary battery may be substantially bilaterally symmetrical, and a pair of reinforcement members 280 may be formed on opposite side portions to each other.

The reinforcement member 280 may be formed between a main body 110 and a wing portion 150 of the secondary battery. In detail, the wing portion 150 may include a bent portion 150a that is bent to face the main body 110 and an extension portion 150b formed between the main body 110 and the bent portion 150a. The reinforcement member 280 may be supported by the bent portion 150a and the extension portion 150b. For example, the reinforcement member 280 may be disposed in space between the main body 110 and the bent portion 150a, and may be supported by the main body 110 and the bent portion 150a and by the extension portion 150b between the main body 110 and the bent portion 150a. In detail, the reinforcement member 280 may contact the main body 110, the bent portion 150a, and the extension portion 150b.

The reinforcement member 280 may have a rectangular rod shape having a rectangular cross-section. For example, the reinforcement member 280 may have a pair of long side portions 280L facing the main body 110 and the wing portion 150 and a pair of short side portions 280S between the long side portions 280L.

For example, the reinforcement member 280 may include side surfaces facing the main body 110 and the wing portion 150 between the main body 110 and the wing portion 150, that is, the long side portions 280L. For example, the reinforcement member 280 may contact the main body 110 and the wing portion 150 of the secondary battery via the side surfaces thereof, and may not have sharp edges facing the main body 110 and the wing portion 150, and damages to the main body 110 or the wing portion 150 due to sharp edges may be prevented.

For example, a position of the reinforcement member 280 may be firmly fixed while being closely adhered between the main body 110 and the wing portion 150 of the secondary battery, that is, while being in contact with the main body 110 and the wing portion 150 via the long side portions 280L. For example, the reinforcement member 280 may have a rectangular cross-section having a height greater than a width thereof. For example, a contact area between the reinforcement member 280 and the main body 110 and the wing portion 150 may be increased by the long side portions 280L of the reinforcement member 280. The reinforcement member 280 may have a form capable of resisting vertical bending or flexing in order to provide protection against an external impact applied in a vertical direction. That is, the reinforcement member 280 has a rectangular form having a height greater than a width.

Figure 5:
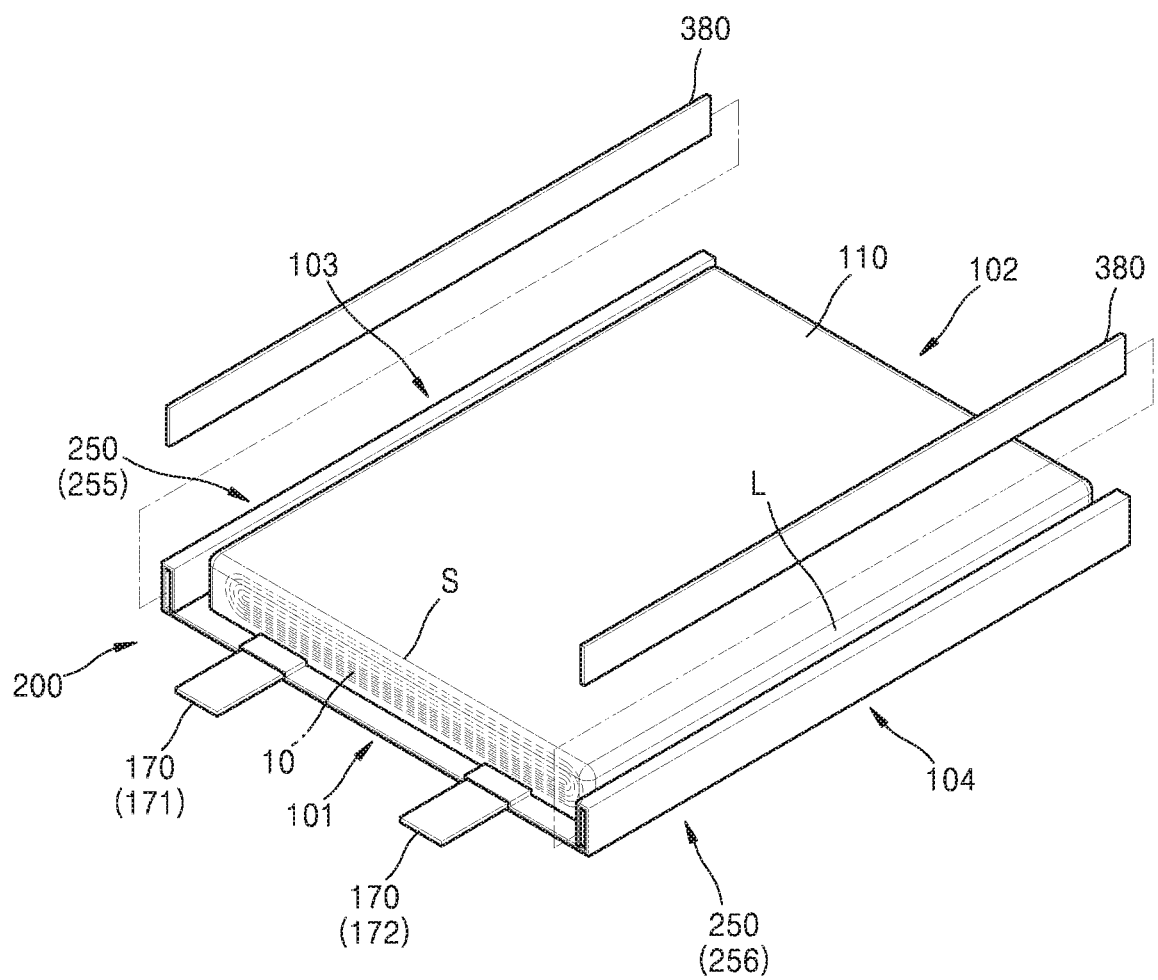
FIG. 5 is a disassembled perspective view of a secondary battery according to another exemplary embodiment.
Figure 6:
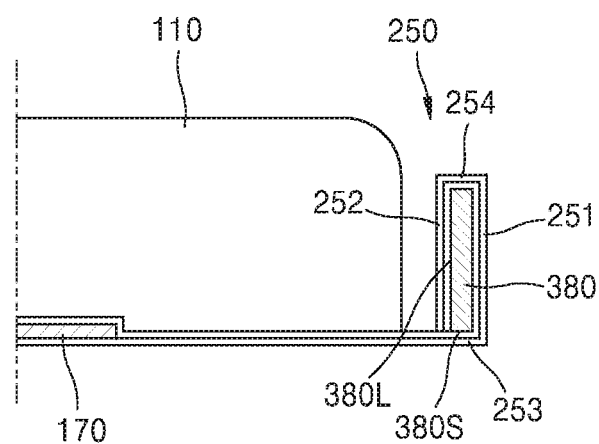
FIG. 6 is a diagram for describing a reinforcement member of the secondary battery FIG. 5.

FIG. 5 is a disassembled perspective view of a secondary battery according to another exemplary embodiment. FIG. 6 is a diagram for describing a reinforcement member 380 of the secondary battery of FIG. 5.

Referring to FIGS. 5 and 6, the secondary battery includes a wing portion 250 that is bent to surround the reinforcement member 380. That is, the wing portion 250 may be formed by bending a sealing portion of a pouch 200 several times. In detail, the wing portion 250 may be bent a first time to face the main body 110 by folding up the sealing portion, and then the sealing portion is bent again inwardly towards the main body 110, and then bent again to face the main body 110. In other words, the wing portion 250 may have three different bending points.

As the wing portion 250 of the secondary battery is bent several times, rigidity of the secondary battery may be improved. In particular, as the wing portion 250 is formed to surround the reinforcement member 380, the wing portion 250 may supplement rigidity of the secondary together with the reinforcement member 280, and may exhibit sufficient rigidity against external impact.

Referring to FIG. 6, the reinforcement member 380 may also be completely surrounded by the wing portion 250. For example, the wing portion 250 may surround the reinforcement member 380 overall so that four side surfaces of the reinforcement member 380 may be completely covered by the wing portion 250. However, the exemplary embodiments are not limited thereto. For example, according to another exemplary embodiment, the wing portion 250 may completely cover three side surfaces of the reinforcement member 380 and only partially cover the remaining side surface.

The wing portion 250 may include first and second bent portions 251 and 252 that are bent to face the main body 110 and first and second extension portions 253 and 254 between the first and second 251 and 252. The reinforcement member 380 may be surrounded by the first and second bent portions 251 and 252 and the first and second extension portions 253 and 254. The reinforcement member 380 may contact the first and second bent portions 251 and 252 and the first and second extension portions 253 and 254, thereby being supported by the first and second bent portions 251 and 252 and the first and second extension portions 253 and 254.

The reinforcement member 380 may have a rectangular rod shape having a rectangular cross-section. For example, the reinforcement member 380 may have a pair of long side portions 380L facing the first and second bent portions 251 and 252 and a pair of short side portions 380S facing the first and second extension portions 253 and 254.

For example, the reinforcement member 380 may contact the wing portion 250 via the pair of long side portions 380L and the pair of short side portions 380S, and may not have sharp edges facing the wing portion 250, and damages to the wing portion 250 due to the sharp edges may be prevented.

For example, the reinforcement member 380 may be in the form of a rectangular cross-section having a greater height than a width thereof. For example, a contact area between the reinforcement member 380 and the first and second bent portions 251 and 252 may be increased via the long side portions 380L of the reinforcement member 380. The reinforcement member 380 may have a form to be capable of resisting vertical bending or flexing in order to provide against external impact applied in a vertical direction, that is, a rectangular form having a greater height than a width.

Referring to FIG. 5, the secondary battery may have an approximately hexahedral shape including two main surfaces including upper and lower surfaces and side portions 101, 102, 103, and 104 between the main surfaces. In detail, the side portions 101, 102, 103, and 104 may include a first side portion 101 from which an electrode tab 107 is withdrawn, a second side portion 102 formed opposite the first side portion 101, and third and fourth side portions 103 and 104 extending in parallel to each other between the first and second side portions 101 and 102.

When assuming that the second battery includes a pair of short side portions S that are relatively short and a pair of long side portions L that are relatively long, the first and second side portions 101 and 102 of the secondary battery may correspond to the short side portions S, and the third and fourth side portions 103 and 104 of the secondary battery may correspond to the long side portions L. Here, the reinforcement member 380 may extend along the long side portions L to thereby provide against external impact in a broad range.

For example, the reinforcement member 380 extends along the third and fourth side portions 103 and 104 of the secondary battery, and may extend over the entire lengths of the third and fourth side portions 103 and 104. This structure is to protect the secondary battery in a broad range.

The wing portion 250 may include a pair of first and second wing portions 255 and 256 that are respectively formed on the third and fourth side portions 103 and 104 of the secondary battery facing each other. The reinforcement member 380 may be disposed at each of the first and second wing portions 255 and 256.

Figure 7:
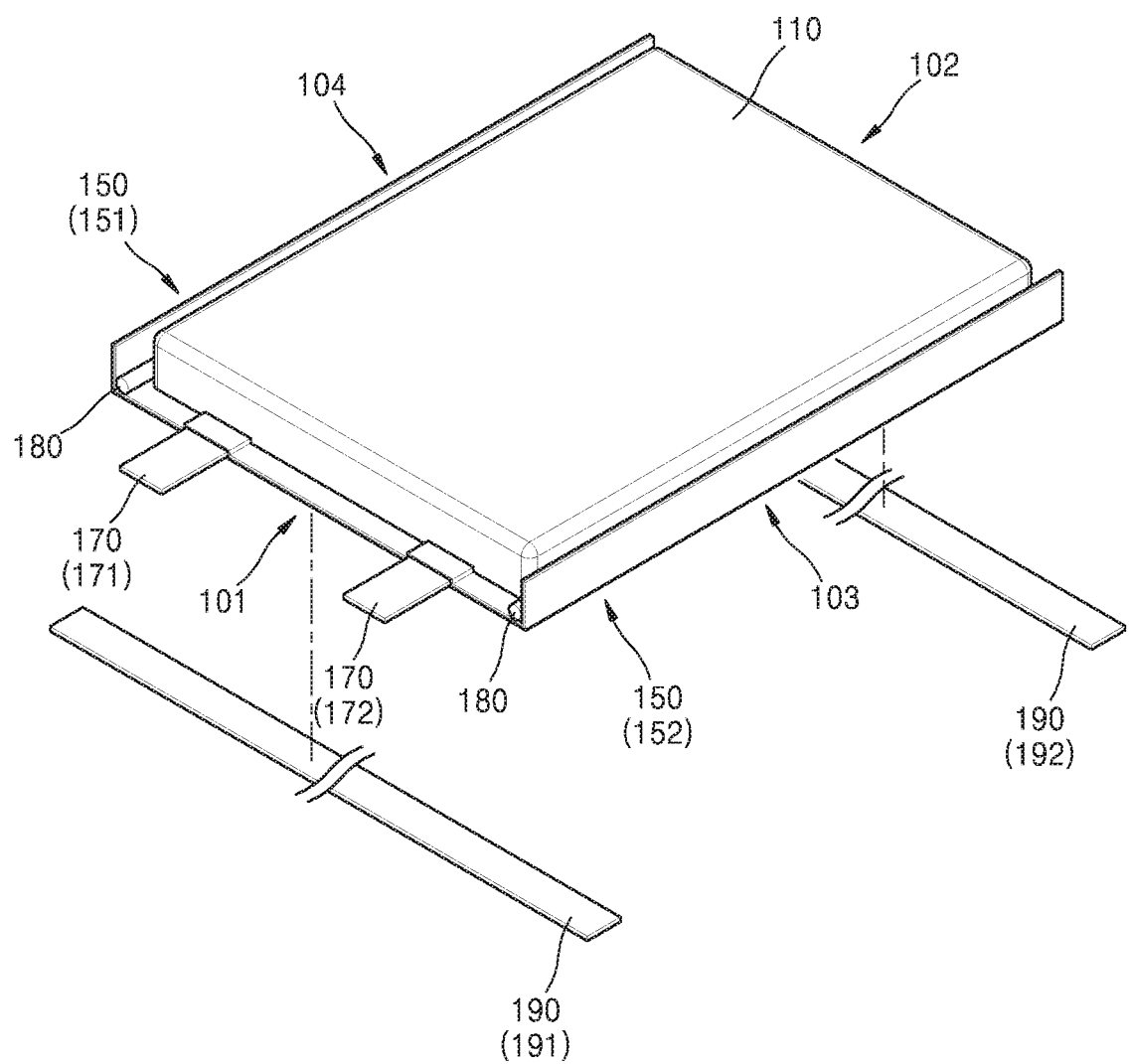
FIG. 7 is a disassembled perspective view illustrating a secondary battery according to another exemplary embodiment.
Figure 8:
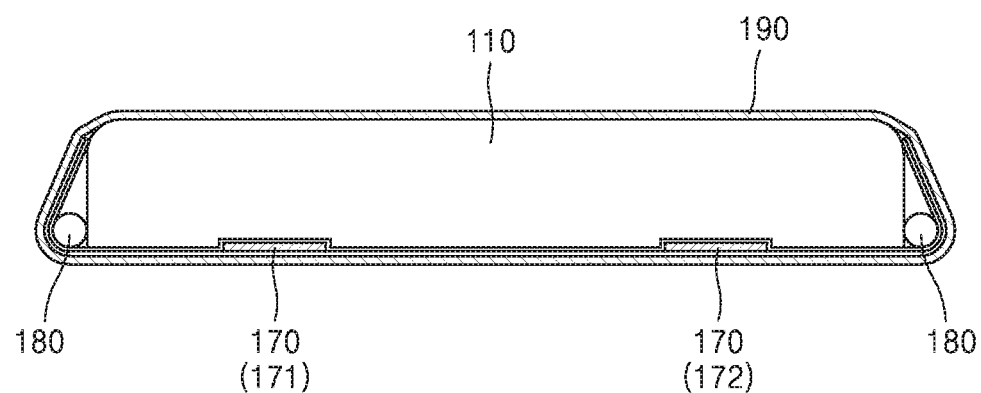
FIG. 8 is a diagram for describing a fixation tape of the secondary battery FIG. 7.

FIG. 7 is a disassembled perspective view illustrating a secondary battery according to another exemplary embodiment. FIG. 8 is a diagram for describing a fixation tape of the secondary battery of FIG. 7.

Referring to FIGS. 7 and 8, a reinforcement member 180 may be disposed at a position where withdrawal of an electrode tab 170 is not disturbed, that is, at third and fourth side portions 103 and 104 of the secondary battery. In detail, the reinforcement member 180 may be disposed between a main body 110 accommodating an electrode assembly and a wing portion 150 that is bent to face the main body 110.

A position of the reinforcement member 180 may be fixed by using a fixation tape 190 that completely surrounds the main body 110 and the wing portion 150 and the reinforcement member 180 together. When the secondary battery includes a first side portion 101, from which an electrode tab 170 is withdrawn, a second side portion 102 formed opposite the first side portion 101, and third and fourth side portions 103 and 104 extending in parallel to each other between the first and second side portions 101 and 102, a pair of reinforcement members 180 may be respectively formed at the third and fourth side portions 103 and 104, and the fixation tape 190 may include a first fixation tape 191 surrounding the first side portion 101 and a second fixation tape 192 surrounding the second side portion 102.

Figure 9:
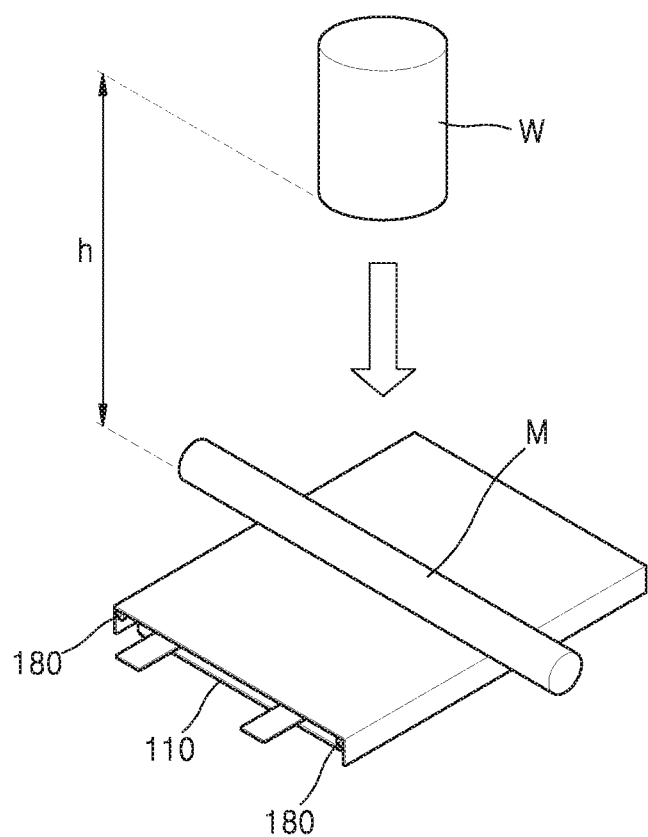
FIG. 9 illustrates a safety evaluation test of a secondary battery according to an exemplary embodiment.

FIG. 9 illustrates a safety evaluation test of a secondary battery according to an exemplary embodiment. In the safety evaluation test, a rod M is placed at a central location of the secondary battery, and a weight W of 9.1 kg is dropped from a height h of 61 cm on the secondary battery. Then, it is determined whether a defect of the secondary battery caused by an external impact with the weight W through the rod M is generated. For example, if it detected that gas is generated, leakage of an electrolyte solution occurs, smoke is generated, or even ignition or explosion or the like occurs, it may be determined that a defect is generated.

According to the secondary battery of the exemplary embodiments, transfer of impact to internal components of the secondary battery, that is, to the electrode assembly, may be blocked by using the reinforcement member 180 that blocks impact of the weight W. Thus, gas, leakage of an electrolyte solution, smoke, ignition, explosion or the like may be prevented, and safety of the secondary battery may be improved.

According to the exemplary embodiments, as internal components of a secondary battery, for example, an electrode assembly, are protected from external impact, degradation of charging or discharging characteristics of the secondary battery or the danger of ignition, rupture, or explosion due to damages to the electrode assembly may be reduced. In addition, the secondary battery may be protected from external impact in a broad range of the secondary battery, and thus the danger of negligent accidents due to unexpected impact may be reduced.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A secondary battery comprising:
    a main body comprising an upper surface and a lower surface opposing the upper surface and accommodating an electrode assembly;
    a wing portion extending from the lower surface of the main body and bent in at least one portion; and
    a reinforcement member between the main body and the wing portion, the reinforcement member including a cylindrical rod having a circular cross-section,
    wherein the reinforcement member is formed of a metal having a rigidity configured to block external impacts, and
    wherein the reinforcement member is positioned closer to the lower surface than the upper surface of the main body, and wherein the reinforcement member is positioned only adjacent to the lower surface of the main body so as not to overlap the upper surface of the main body in a direction of the width of the main body.

2. The secondary battery of claim 1, wherein the wing portion includes a bent portion facing the main body and an extension portion between the main body and the bent portion.

3. The secondary battery of claim 2, wherein the reinforcement member is supported by the main body, the bent portion, and the extension portion.

4. The secondary battery of claim 3, wherein the reinforcement member contacts the main body, the bent portion, and the extension portion.

5. The secondary battery of claim 1, wherein when the secondary battery includes a first side portion from which an electrode tab is withdrawn, a second side portion formed opposite the first side portion, and third and fourth side portions extending in parallel to each other between the first and second side portions, a pair of reinforcement members are respectively formed at the third and fourth side portions.

6. The secondary battery of claim 1, wherein when the secondary battery includes a pair of short side portions that are relatively short and a pair of long side portions that are relatively long, the reinforcement member extends along the long side portions.

7. The secondary battery of claim 1, wherein a position of the reinforcement member is fixed using a fixation tape that surrounds the main body, the wing portion, and the reinforcement member.

8. The secondary battery of claim 7, wherein when the secondary battery includes a first side portion from which an electrode tab is withdrawn, a second side portion formed opposite the first side portion, and third and fourth side portions extending in parallel to each other between the first and second side portions,
a pair of reinforcement members are respectively formed at the third and fourth side portions, and
the fixation tape includes a first fixation tape surrounding the first side portion and a second fixation tape surrounding the second side portion.

9. A secondary battery comprising:
a main portion comprising an upper surface and a lower surface opposing the upper surface and that houses an electrode assembly;
at least one wing portion that is positioned on at least one lateral side of the main portion and extends from the lower surface of the main portion; and
a reinforcing member positioned adjacent the lateral side of the main portion, the reinforcement member including a cylindrical rod having a circular cross-section,
wherein the reinforcing member extends the length of the at least one lateral side of the main portion,
wherein the reinforcing member is formed of a metal having a rigidity configured to block external impacts, and
wherein the reinforcement member is positioned closer to the lower surface than the upper surface of the main portion, and wherein the reinforcement member is positioned only adjacent to the lower surface of the main portion so as not to overlap the upper surface of the main portion in a direction of the width of the main portion.

10. The secondary battery of claim 9, wherein the at least one lateral side of the main portion comprises a first and second lateral side of the main portion and wherein the at least one reinforcing member comprises a first and second reinforcing member positioned adjacent the first and second lateral side of the main portion.

11. The secondary battery of claim 10, wherein the first and second reinforcing members are interposed between the wing portion and the main portion of the secondary battery.

12. The secondary battery of claim 10, wherein the first and second lateral sides of the main portion are spaced apart by a front side of the main portion of the battery and wherein one or more electrodes of the battery extend out of the first side of the main portion.

13. The secondary battery of claim 1, wherein an unbent portion of the wing portion is formed adjacent to the lower surface of the main body, wherein the at least one bent portion of the wing portion is formed adjacent to the upper surface of the main body, wherein the unbent portion of the wing portion extends a first distance away from the lower surface of the main body in a first direction, wherein the at least one bent portion of the wing portion is formed a second distance away from the upper surface of the main body in the first direction, and wherein the first distance is greater than the second distance.

14. The secondary battery of claim 9, wherein an unbent portion of the wing portion is formed adjacent to the lower surface of the main portion, wherein the at least one bent portion of the wing portion is formed adjacent to the upper surface of the main body, wherein the unbent portion of the wing portion extends a first distance away from the lower surface of the main portion in a first direction, wherein the at least one bent portion of the wing portion is formed a second distance away from the upper surface of the main portion in the first direction, and wherein the first distance is greater than the second distance.

\* \* \* \* \*

UNITED STATES PATENT AND TRADEMARK OFFICE
CERTIFICATE OF CORRECTION

| | | |
|---|---|---|
| PATENT NO. | : 10,938,056 B2 | Page 1 of 1 |
| APPLICATION NO. | : 15/228777 | |
| DATED | : March 2, 2021 | |
| INVENTOR(S) | : Bae et al. | |

It is certified that error appears in the above-identified patent and that said Letters Patent is hereby corrected as shown below:

On the Title Page

In Column 1 (item (72)), under Inventors, after "Yongin-si (KR)" add --Minyoung Jang, Yongin-si (KR), Yookyoung Kim, Yongin-si (KR)--

Signed and Sealed this
Tenth Day of February, 2026

John A. Squires
*Director of the United States Patent and Trademark Office*